United States Patent
Tanaka et al.

[11] Patent Number: 5,299,058
[45] Date of Patent: Mar. 29, 1994

[54] METHOD OF REPRODUCING MIRAGE-LIKE PHENOMENON

[75] Inventors: Tetsu Tanaka; Isamu Amemiya; Chikanobu Tomikawa; Koji Aoki, all of Uozu, Japan

[73] Assignee: Nippon Carbide Kogyo Kabushiki Kaisha, Tokyo, Japan

[21] Appl. No.: 848,977

[22] PCT Filed: Aug. 21, 1990

[86] PCT No.: PCT/JP90/01059
  § 371 Date: Apr. 20, 1992
  § 102(e) Date: Apr. 20, 1992

[87] PCT Pub. No.: WO92/03809
  PCT Pub. Date: Mar. 5, 1992

[51] Int. Cl.$^5$ ............ G02B 1/06; G02B 3/12; G02B 27/22

[52] U.S. Cl. .................. 359/478; 359/479; 359/665; 359/667

[58] Field of Search ............ 359/667, 478, 665, 666, 359/479

[56] References Cited

U.S. PATENT DOCUMENTS 3,402,980  9/1968  Hutson .................. 359/667
3,413,059  11/1968  Berreman ............... 359/667

Primary Examiner—Scott J. Sugarman
Attorney, Agent, or Firm—Young & Thompson

[57] ABSTRACT

A method of reproducing a mirage-like phenomenon which comprises forming a structure comprising at least two see-through phases wherein the density of a lower phase in contact with an upper phase is larger than that of the upper phase, the density ratio (A) therebetween is $1 < A < 50$ and the interface between the lower phase and the upper phase has an even or curved surface.

9 Claims, 2 Drawing Sheets

METHOD OF REPRODUCING MIRAGE-LIKE PHENOMENON

TECHNICAL FIELD

The present invention relates to a method of artificially reproducing a mirage-like phenomenon.

BACKGROUND ART

A mirage is a phenomenon caused as a result of the bending of light rays, which should go straight ahead by nature, due to a difference in the refractive index attributable to a difference in the temperature of the air, and more particularly a phenomenon in which distant objects such as buildings or trees are seen stretched, shrunken, inverted, or displaced. A mirage seen in winter in Uozu, Japan, a mirage seen in spring, a mirage over deserts, and an inferior mirage seen on a hot road are known as representative mirage-like phenomena seen in the nature.

Although various theories have been introduced as the cause of these phenomena, the matter remains unelucidated as yet. Although attempts have been made to reproduce these phenomena, the reproduction of a clear mirage-like image at any time has yet been unsuccessful. Further, since it has been believed that a depth of at least 100 m is necessary for realizing a mirage by making use of a gas, it has been thought to be utterly impossible to artificially reproduce a clear mirage-like image on a small scale.

Accordingly, an object of the present invention is to provide a method of reproducing a mirage-like phenomenon which enables a desired mirage-like phenomenon to be clearly reproduced at any time.

DISCLOSURE OF INVENTION

The present invention has been made with a view to solving the above-described problems, and the above-described object has been attained by providing a method of reproducing a mirage-like phenomenon, characterized by forming a structure comprising at least two see-through phases wherein the density of a lower phase in contact with an upper phase is larger than that of the upper phase, the density ratio (A) therebetween is $1 < A < 50$ and the interface between the lower phase and the upper phase has an even or curved surface, and seeing a real object through at least one interface of the structure comprising at least two phases, thereby enabling a mirage-like image to be visualized.

DETAILED DESCRIPTION OF THE INVENTION

Figure 1:
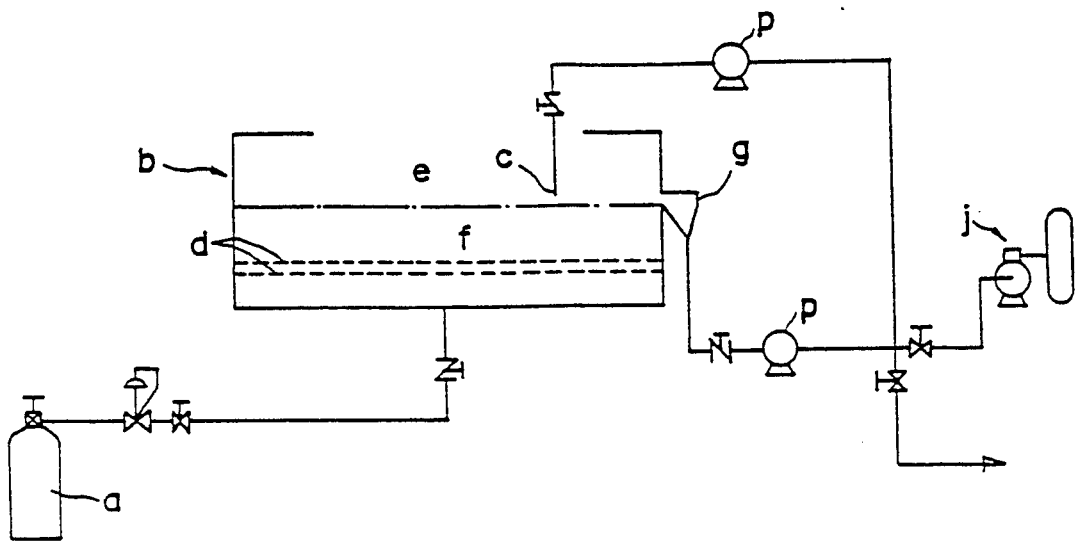
FIG. 1 is a basic flow sheet for Example 2 wherein use is made of a liquefied gas packed in a gas cylinder.

In the present invention, the phases of a two-phase structure may be any of a gas phase, a liquid phase and a solid phase, preferably a gas phase and a liquid phase, particularly preferably a gas phase.

In the upper phase and the lower phase in contact with each other, the density of the lower phase ($A_1$ g/cm$^3$) should be larger than that of the upper phase ($A_2$ g/cm$^3$), and the density ratio therebetween ($A = A_1/A_2$) is $1 < A < 50$, preferably $1.0005 < A < 30$, particularly preferably $1.1 < A < 20$. When A is 1 or less, the visual effect is poor. On the other hand, when A is 50 or more, the image turns to an unnatural virtual image which is unfavorable from a visual viewpoint. The method of measuring the density and the numerical value thereof are determined by the description in Chapter 5.1 of "Kagaku Binran, Kisohen, II (1966)".

Further, in general, the refractive index ($N_1$) of the lower phase should be larger than the refractive index ($N_2$) of the upper phase, and the refractive index ratio ($N = N_1/N_2$) is preferably $1.0005 < N\ 1.2$, particularly preferably $1.0008 < N < 1.15$, still preferably $1.001 < N < 1.1$. The method of measuring the refractive index and the numerical value thereof are determined by the description in Chapter 10.2 of "Kagaku Binran, Kisohen, II (1966)".

The "even surface" in the present invention may be any one having many unevennesses as far as the average state of the unevennesses at the interface is such that the visual angle in the vertical direction of the interface as viewed from a suitable point on an extension to the interface is 5° or less. The surface is preferably horizontal but may be inclined or curved to some extent.

In the present invention, the expression "through the interface" of "seeing a real object through at least one interface of the structure comprising at least two phases" is intended to mean either "by allowing light rays to transmit through the interface" or "by allowing light rays to reflect at the interface". Therefore, the meaning of "through" varies depending upon the position of the real object and the seeing position.

The term "mirage-like phenomenon" used in the present invention is intended to mean a phenomenon caused as a result of the bending of light rays which should go straight ahead by nature, and more particularly a phenomenon in which distant objects are seen stretched, shrunken, inverted, or displaced, and examples thereof include a mirage seen in winter in Toyama prefecture, a mirage seen in spring, a mirage over deserts, and an inferior mirage seen on a hot road.

In the present invention, it is particularly preferred that each phase of the above-described structure comprising at least two phases comprise a gas phase. The gas is preferably at least one member selected from the group consisting of air, nitrogen, carbon dioxide, steam, inert gas (rare gas) and halogenated hydrocarbon. The gas constituting the lower phase is preferably selected from the so-called flon gas and a cooled air from the viewpoint of the largeness of the absolute refractive index, the largeness of the density, low cost, high safety, easiness of recovery, etc. Preferred examples of the flon gas include $CCl_3F$ (R-11), $CCl_2F_2$ (R-12), $CClF_3$ (R-13), $CBrF_3$ (R-13B1), $CF_4$ (R-14), $CHCl_2F$ (R-21), $CHClF_2$ (R-22), $CHF_3$ (R-23), $CCl_2F\text{-}CCl_2F$ (R-112), $CClF_2\text{-}CCl_2F$ (R-113), $CClF_2\text{-}CClF_2$ (R-114), $CBrF_2\text{-}CBrF_2$ (R-114B2), $CClF_2\text{-}CF_3$ (R-115), $CF_3\text{-}CF_3$ (R-116), $CH_3\text{-}CClF_2$ (R-142b), $CH_3CHF_2$ (R-152a) and $(CF_2\text{-}CF_2)_2$ (R-C318). The gas constituting the upper phase is preferably air, nitrogen, carbon dioxide or the like from the viewpoint of the smallness of the absolute refractive index, the smallness of the density, high safety and low cost. It is also preferred to use the same gas as that constituting the lower gas at a higher temperature.

When both the phases are gaseous, the density ($A_1$) of the gas constituting the lower phase should be larger than the density ($A_2$) of the gas constituting the upper phase and the density ratio (A) is $1.0 < A < 50$, preferably $1.5 < A < 30$, particularly preferably $2.0 < A < 20$. When A is less than 1, not only the size of the apparatus should be remarkably increased, which is economically disadvantageous, but also the visual effect is small. On the other hand, when A is larger than 50, the number of combinations of gases for realizing the reproduction of a mirage-like image is small, which inevitably makes it necessary to cool or pressurize the inside of the apparatus, so that this method not only is extremely disadvantageous economically, but also makes the formed image unnatural because it is impossible to obtain a visual effect equal to that of the mirage seen in the nature.

Further, when both the phases are gaseous, the use of a gas stream as one of them is a particularly preferred embodiment because this facilitates the formation of an even surface at the interface between the lower and upper phases. In still preferred embodiment, both the phases comprise gas streams flowing in the same direction. It is particularly preferred that the gas streams flow in parallel to the interface.

The above-described two-phase structure is formed within a predetermined container, and the suction of the gas stream from one side of the container enables an even interface to be formed, so that a clear mirage-like image can be visualized. Regarding the position of suction, the suction around the interface between the two phases in the two-phase structure enables a more even interface to be formed, so that a more clear mirage-like image can be visualized. The suction is conducted by evacuating the inside of a tube or a hole to introduce a gas thereinto.

It is preferred that the above-described two-phase structure be formed within a container having at least one transparent side face.

When both the phases are gaseous, the mirage phenomenon is reproduced as follows. At the outset, a glass or plastic chamber having at least one transparent side face is prepared and the inside of the chamber is filled with a gas ($A_2$) having a smaller density and always replenished with a fresh gas. Subsequently, a substance having a larger density is supplied in the form of a gas or a liquid through the bottom of the chamber. When this substance having is supplied in the form of a gas, the following procedure (1) is employed, while when it is supplied in the form of a liquid, the following procedure (2) is employed.

(1) Supply of the substance in the form of a gas:

A gas having a larger density is introduced as smoothly or slowly as possible through the bottom of the chamber to gradually push up the gas having a smaller density, thereby overflowing the gas having a larger density ($A_1$) at a position around the center of the chamber. After this condition is maintained, the gas is sucked through a suction port provided on the overflow level within the chamber, and this condition is maintained.

(2) Supply of the substance in the form of a liquid:

A liquid for providing a gas having a larger density is put on the bottom of the chamber, and heat is applied to generate a necessary gas. The subsequent procedure is the same as that of the case where the substance is supplied in the form of a gas.

These procedures enable two gases different from each other in the density to be separated from each other and a gas layer comprising two phases in contact with each other at an even plane to be formed. If necessary, the two gases may be partitioned by means of an air curtain for the purpose of evening the plane at which the two gases come into contact with each other.

When an object located on one side of the chamber is seen from the other side while maintaining the inside of the chamber in this state, light rays are bent upon being passed through the two gases different from each other in the density, thereby enabling an intended mirage state to be obtained.

The mirage-like image may be formed on various scales according to need. The use of a video, etc. can make the mirage-like image look on a scale equal to that of the mirage seen in the nature.

It is also possible to make the mirage-like image look in three dimensions through the utilization of television technology.

When both the phases are liquid, the effect of the present invention can easily be obtained when the density ($A_1$) of the liquid constituting the lower phase is larger than the density ($A_2$) of the liquid constituting the upper phase and the density ratio ($A = A_1/A_2$) is preferably $1.0005 < A < 5.0$, particularly preferably $1.0005 < A < 3.0$, still preferably $1.1 < A < 2.0$.

Further, when both the phases are liquid, the refractive index ($N_1$) of the liquid constituting the lower phase should be larger than the refractive index ($N_2$) of the liquid constituting the upper phase and the refractive index ratio ($N = N_1/N_2$) is preferably $1.0005 < N < 1.2$, particularly preferably $1.001 < N < 1.15$, still preferably $1.002 < N < 1.05$.

Further, in a preferred embodiment, when both the phases are liquid, at least one of them comprises a liquid for the purpose of attaining the effect of evening the interface between the lower and upper surfaces. In a still preferred embodiment, both the phases comprise liquid streams flowing in the same direction. It is particularly preferred that the liquid streams flow in parallel to the interface.

The two-phase structure is formed within a predetermined container, and the suction of the liquid stream from one side of the container enables an even interface to be formed, so that a clear mirage-like image can be visualized. Regarding the position of suction, the suction around the interface between the two phases of the two-phase structure enables a more even interface to be formed, so that a more clear mirage-like image can be visualized. The suction of the liquid is conducted by evacuating the inside of a tube or a hole to introduce a liquid thereinto.

It is preferred that the two-phase structure be formed within a container having at least one transparent side face.

Although examples of the liquid used in the present invention include any combination of transparent liquids satisfying the above-described requirements, a combination of liquids which are compatible with each other is preferred from a visual viewpoint.

A combination of liquids which are nonflammable, noncorrosive and chemically stable is preferred from the viewpoint of safety. For example, use may be made of a combination of water with an aqueous solution. Sugars, ketones, alcohols, organic salts and organic acids, such as sucrose, acetone, glycerin, ethyl alcohol, sodium acetate and tartaric acid, and further inorganic salts, inorganic bases and inorganic acids, such as sodium chloride, ammonia and hydrochloric acid, may be used as the solute of the aqueous solution.

Besides the above-described combinations, it is also possible to use a combination of water with acetone and a combination of acetone with ethyl alcohol. Further, a combination of hexane with toluene may also be used as far as due attention is given to the flammability of these substances.

In the present invention, when both the phases of the two-phase structure are solid, the density ($A_1$) of a transparent solid constituting the lower phase should be larger than the density ($A_2$) of a solid constituting the upper phase and the density ratio ($A = A_1/A_2$) is preferably $1.0005 \leq A < 5.0$, particularly preferably $1.0005 \leq A < 3.0$, still preferably $1.0005 \leq A < 2.0$. Further, when both the phases are solid, the refractive index ($N_1$) of the solid constituting the lower phase should be larger than the refractive index ($N_2$) of the solid constituting the upper phase and the refractive index ratio ($N = N_1/N_2$) is preferably $1.0005 < N < 1.2$, particularly preferably $1.001 < N < 1.15$, still preferably $1.002 < N < 1.1$.

Examples of the solid used in the present invention include any of crystalline and amorphous substances as far as the combination of solids satisfies the above-described requirements. The combination may be one comprising different substances or the same kind of substance containing impurities for varying the density and refractive index. Further, it is also possible to utilize the birefringence of the same kind of substance. Substances which are liquid or gaseous in a normal state, such as ice or dry ice, may be used in the form of a solid under particular conditions. Other specific examples of the solid include inorganic amorphous substances such as glass, inorganic crystalline substances such as sodium chloride, calcite and diamond, synthetic resins such as acrylic resin, vinyl chloride resin and styrene resin, and natural resins such as Canada balsam, shellac and damar.

Examples of the method of forming the interface when both the phases are solid include one wherein separately prepared two layers are joined to each other by means of mechanical processes such as thermal fusion bonding, ultrasonic fusion bonding and contact bonding, or by means of a pressure-sensitive adhesive or an adhesive to form an interface, one wherein one layer is formed on a separately prepared another layer by polymerization, precipitation, drying or the like to form an interface, one wherein an impurity is allowed to penetrate into a mass consisting of one layer alone to a given depth to form an interface, and one wherein a liquid containing an impurity is stepwise polymerized and solidified by cooling or the like to form an interface.

EXAMPLES

The present invention will now be described in more detail by referring to the following Examples.

EXAMPLE 1

A glass tube having an inner diameter of 5 mm and a length of 30 cm was set in a transparent glass water tank having a width of 30 cm, a depth of 60 cm and a height of 30 cm so that the tube stood upright and the lower end of the tube was 10 cm above the bottom face of the tank. The position of the glass tube was made easily movable within the tank. The upper end of the tube was connected to an aspirator by means of a rubber tube through a trap cooled with acetone/dry ice.

300 ml of trichlorofluoromethane (flon R-11) (b.p. 24° C., 1 atm) was introduced into the water tank, as a gas for the lower phase and heated from 1 m above the tank by means of a 500-W spot light for photography.

Five minutes after the initiation of heating, suction by means of an aspirator was started to prepare an atmosphere capable of reproducing a mirage-like phenomenon and having a smooth interface between trichlorofluromethane ($A_1 = 5.86$ g/l) as the lower layer and air as the upper layer ($A_2 = 1.19$ g/l) and having a density ratio ($A = A_1/A_2$) of 4.9 (25° C., 1 atm) and an even interface. Then, toys (height: 5–30 cm) set 3 m distant from the water tank in the direction of the depth were observed from a position 3 m distant from the opposite side of the water tank.

A seeing height of 10 cm above the bottom face of the water tank was regarded as a reference level. When the toys were observed 20 cm below the reference level, no change was observed in the image. When they were observed 15 cm below the reference level, a partially stretched image was observed. When the position of the eyes is further shifted upward, the range of the stretched image and the length of the stretched image are increased. When they were observed about 4 cm to 1 cm below the reference level, part of the image was seen inverted. Further, an extreme shrinkage of the image was observed when the seeing height was around the reference level, and the image gradually returned to the original state when the seeing height exceeded the reference level. When the seeing height was about 15 cm or more above the reference level, no change in the image was observed. Thus, a clear mirage-like phenomenon was reproduced.

Even when the position of the suction port (lower end) of the glass tube was varied, no change was observed in the effect of reproducing a mirage-like image.

EXAMPLE 2

A tank b having a width of 60 cm, a height of 80 cm, and a depth of 200 cm was manufactured from an iron sheet and a transparent vinyl chloride sheet. Two perforated plates d (a punching metal No. 8 manufactured by Kansai Kanaami K. K. having a hole diameter of 1 mm and a numerical aperture of 22.7%) as a distributor were provided respectively 25 cm and 30 cm above the bottom face to partition the tank. An overflow port g having a height of 2 cm and a width of 60 cm was provided 25 cm above the upper perforated plate. A suction port c having a diameter of 2.5 cm was perpendicularly hung down from the above and connected to a compressor j through a suction pump p and a valve.

Monochlorodifluoromethane f (flon R-22) (density $A_1 = 3.55$ g/l) packed in a gas cylinder a for a liquefied gas was injected as a gas for the lower phase into the tank from the bottom thereof at a velocity of $1 \times 10^{-3}$ m$^3$/sec through a pressure reducing valve (a flow sheet of this system is shown in FIG. 1).

15 min after the injection of the gas, suction was started through the upper suction port c at a rate of about $1 \times 10^{-3}$ m$^3$/sec to prepare an atmosphere capable of easily reproducing a mirage-like phenomenon and having a smooth interface between two phases of monochlorodifluromethane f ($A_1 = 3.55$ g/l) as the lower phase and air as the upper phase e ($A_2 = 1.19$ g/l) and having a density ratio ($A = A_1/A_2$) of 3.0 (25° C., 1 atm).

A plate on which five photographs of a ship having a height of 10 cm were stepwise put within the range from a position 30 cm above the overflow port g as a reference level to a position 30 cm below the reference level was placed 3 m distant from the tank in the direction of the depth thereof to observe the photographs from a position 3 m distant from the opposite side of the tank. When observation was conducted from a position 30 cm below the overflow port g, no change was observed in the image of the photographs. On the other hand, when the observation was conducted from a position 20 cm below the overflow port, a stretched image was observed. Further, when the position of the eyes was shifted upward and downward around the position of the overflow port, waveringly stretched and shrunk various ship images were observed. Thus, a clear mirage-like phenomenon was reproduced.

EXAMPLE 3

The bottom face of the tank b used in the abovedescribed Example 2 was surrounded by 10 m of a copper tube h having an outer diameter of 8 mm and an inner diameter of 6 mm so that steam is passed through the inside of the tube.

Figure 2:
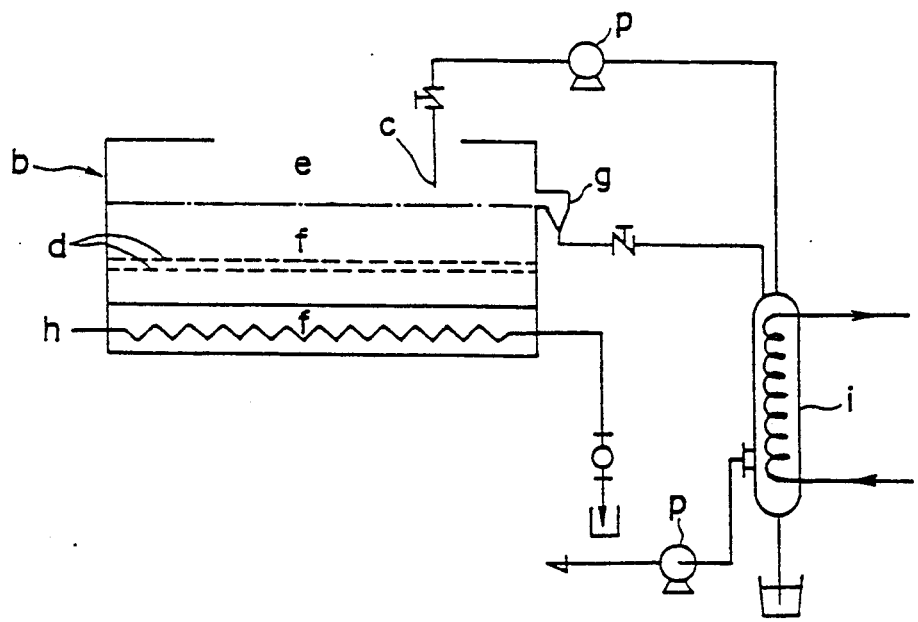
FIG. 2 is a basic flow sheet for Example 3 wherein use is made of a vaporized substance which is liquid in the normal state.

A stainless steel vat having a width of 45 cm, a depth of 90 cm and a height of 15 cm was placed on the lower part of the tank, and 30 l of trichlorofluoromethane (flon R-11) f' was put therein (a flow sheet of this system is shown in FIG. 2). In FIG. 2, i represents a cooling apparatus.

Steam was passed at a pressure of 2 kg/cm$^2$G through a copper tube h. Observation was conducted 20 min after the initiation of the passing of the steam. As a result, there was observed an atmosphere capable of easily reproducing a mirage-like phenomenon. The atmosphere had a smooth interface between trichlorofluoromethane f (density $A_1 = 5.86$ g/l) as the lower phase and air e (density $A_2 = 1.19$ g/l) as the upper phase and a density ratio ($A = A_1/A_2$) of 4.9. A waveringly stretched and shrunk image was observed when the seeing height was around the position of the overflow port g. When suction was started through the suction port c at a rate of about $1 \times 10^{-2}$ m$^2$/sec, the stretching of the image became remarkable. A complete inversion of the image was observed when the seeing height was from the position of the overflow port to about 15 cm above the position of the overflow port g.

EXAMPLE 4

Figure 4:
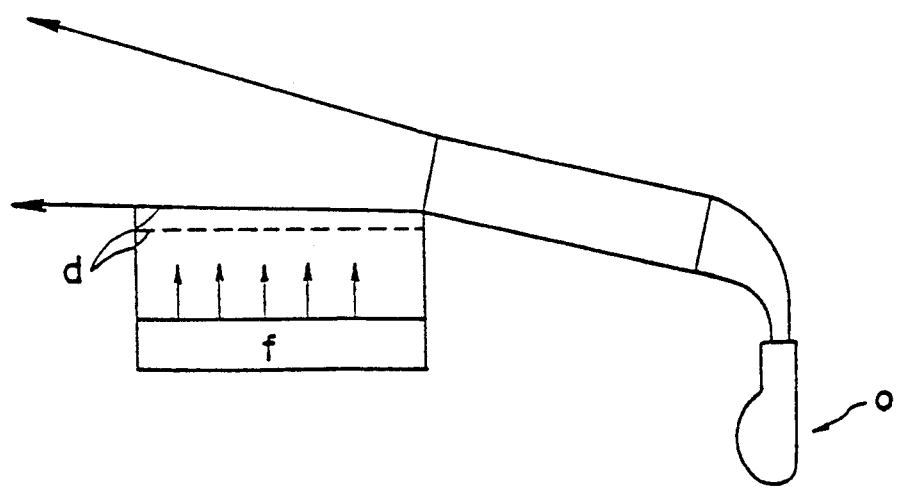
FIG. 4 is a basic flow sheet for Example 4 wherein use is made of an air curtain.

A portion above the perforated plate d of the apparatus used in Example 3 was removed, and a supply opening was provided on the side face. Another opening was connected to a supply opening of an air curtain o (AC-204LTD; mfd. by Hitachi, Ltd.) by means of a flexible vinyl sheet tube (a flow sheet of this system is shown in FIG. 4).

Figure 3:
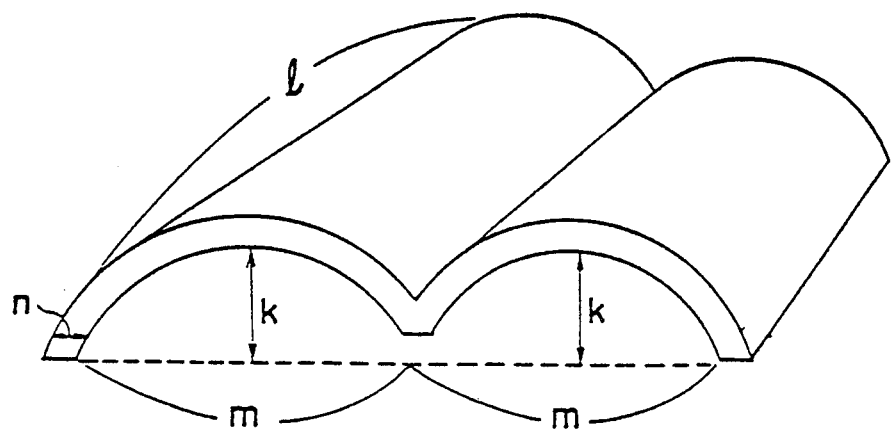
FIG. 3 is a perspective view of the form of a smoke layer formed on a perforated plate in Example 4.

A smoke candle was placed on the bottom face of the apparatus and the air curtain o was turned on when a large amount of smoke was generated on the upper part of the perforated plate d, thus forming two parallel smoke layers each having a semicircular cross section (as shown in FIG. 3 wherein k is 40 cm, l is 2 m, m is 1 m and n is 5 cm). When the supply opening was directed upward by 10°, a layer having a clearest interface was formed, so that the angle was fixed to this value. The smoke candle was removed, and as with Example 3, an experiment was conducted by making use of 30 l of trichlorofluoroethane (flon R-11). Steam of 2 kg/cm$^2$G was passed through the copper tube, and observation was conducted about 20 min after the initiation of passing of steam. As a result, no change was observed in the image. When the air curtain o was turned on, waveringly stretched and shrunk images and inverted images were observed when the seeing height was from about 30 cm above the height of the overflow port g to about 30 cm below the height of the overflow port g.

EXAMPLE 5

18 l of water at 20° C. (refractive index: 1.3330, density: 0.9982) was put in the water tank used in the Example 1.

25 l of a 2% aqueous sucrose solution (refractive index: 1.3359, density: 1.012) which had been separately prepared was introduced into the water tank in 15 min by means of a syphon through the use of a rubber tube having an inner diameter of 5 mm. At that time, the tip of the rubber tube was maintained so as to be in perpendicular contact with the bottom face of the water tank.

After suction was started by making use of an aspirator without a trap, observation was conducted to find out that the same phenomenon as that described in Example 1 was reproduced (density ratio $A = 1.01$).

EXAMPLE 6

A homopolymer of methyl mechacrylate (refractive index: 1.491, density: 1.21) and a homopolymer of styrene (refractive index: 1.593, density: 1.05) each in the form of a transparent plate having a thickness of 3 cm, a width of 4 cm and a length of 10 cm were prepared by bulk polymerization. One surface of each of the transparent plates was immersed in chloroform, and the plates were contact-bonded to each other to prepare a columnar material having a thickness of 6 cm, a width of 4 cm and a length of 10 cm, which was placed as such in a vacuum dryer at 40° C. and allowed to stand in the dryer for one week. The columnar material was placed with the polystyrene layer down, and a toy having a height of 10 cm placed about 3 m distant from the columnar material in the lengthwise direction thereof was observed through the polymethyl methacrylate layer from the polystyrene layer. Stretched, shrunken or inverted images of the toy were observed depending upon a slight change in the angle and position of the observer.

The change in the image was more significant when the image was observed with a monocle having an aperture of 15 mm and a magnification of 5 placed at the seeing position.

EXAMPLE 7

A tank having a width of 60 cm, a height of 50 cm and a depth of 200 cm was manufactured from an iron sheet and a transparent vinyl chloride sheet. Two perforated plates (punching metal No. 8 manufactured by Kansai Kanaami K. K. having a hole diameter of 1 mm and a numerical aperture of 22.7%) as a distributor were provided respectively 25 cm and 30 cm above the bottom face to partition the tank. An air curtain (AC-204LTD; mfd. by Hitachi, Ltd.) was mounted on the upper part of the tank so that the angle of a supplying opening was 11° with respect to the horizontal plane.

Monochlorodifluoromethane (flon R-22) density $A_1 = 3.55$ g/l) was injected into the tank from the bottom thereof as a gas for the lower phase at a velocity of $2 \times 10^{-3}$ m$^3$/sec through a pressure reducing valve. 10 min after the injection of the gas, the air curtain was turned on to prepare an atmosphere capable of easily reproducing a mirage-like phenomenon and having an even interface between two phases of monochlorodifluromethane ($A_1 = 3.55$ g/l) as the lower phase and air as the upper phase ($A_2 = 1.19$ g/l) and having a density ratio ($A = A_1/A_2$) of 3.0 (25° C., 1 atm).

A plate on which five photographs of a ship having a height of 10 cm were stepwise put within the range from a position 30 cm above the upper part of the tank as a reference level to a position 30 cm below the reference level was placed 8 m distant from the tank in the direction of the depth thereof to observe the photographs from a position 8 m distant from the opposite side of the tank. When observation was conducted from a position 30 cm below the upper part of the tank, no change was observed in the image of the photographs. On the other hand, when the observation was conducted from a position 20 cm below the upper part of the tank, a stretched image was observed. Further, when the position of the eyes was shifted upward and downward around the position of the upper part of the tank, waveringly stretched and shrunken ship images were observed. Thus, a clear mirage-like phenomenon was reproduced.

Industrial Applicability

The method of reproducing a mirage-like phenomenon according to the present invention enables a mirage-like phenomenon appearing only when specified requirements are satisfied in the nature to be reproduced at any time and anywhere, which renders the method according to the present invention widely utilizable in the fields of sight-seeing, science, society, etc.

Since apparatuses wherein use is made of the method of the present invention can be manufactured in any of a large size, a medium size and a small size, they can be used in parks, theaters, station squares, seashores, zoological gardens, aquariums, etc. The small-size apparatuses can be utilized in hotels and general households and as toys.

We claim:

1. A method of reproducing a mirage-like phenomenon, comprising the steps of forming a structure comprising at least two see-through phases wherein the density of a lower phase in contrast with an upper phase is larger than that of the upper phase, the density ratio (A) therebetween is $1 < A < 50$ and the interface between the lower phase and the upper phase has an even or curved surface, and positioning a real object relative to at least one interface of the structure comprising at least two phases, such that light rays reflected by said real object are transmitted through or reflected at said at least one interface and thereafter arrive at an observation point, thereby enabling a mirage-like image of said real object to be visualized.

2. A method of reproducing a mirage-like phenomenon according to claim 1, wherein each phase of the structure comprising at least two phases comprises a gas phase.

3. A method of reproducing a mirage-like phenomenon according to claim 2, wherein the gas phase does not enter any chemical reaction under service conditions and can be recovered through cooling or compression.

4. A method of reproducing a mirage-like phenomenon according to claim 2, wherein at least one of the gas phases is at least one member selected from the group consisting of air, nitrogen, carbon dioxide, steam, inert gas (rare gas) and halogenated hydrocarbon.

5. A method of reproducing a mirage-like phenomenon according to claim 1, wherein at least one of the phases comprises a gas stream or a liquid stream.

6. A method of reproducing a mirage-like phenomenon according to claim 5, wherein the structure comprising at least two phases is formed within a predetermined container and the gas stream is formed by sucking the gas from part of a side face of the container or the inside of the container.

7. A method of reproducing a mirage-like phenomenon according to claim 5, wherein suction is conducted around at least one interface between the two phases in the structure.

8. A method of reproducing a mirage-like phenomenon according to claim 1, wherein the structure comprising at least two phases is formed within a container having at least one transparent side face.

9. A method of reproducing a mirage-like phenomenon according to claim 8, wherein said real object is positioned exteriorly of said container, and wherein said light rays reflected by said real object traverse said at least one transparent side face of said container.

* * * * *